(12) United States Patent
Brown

(10) Patent No.: US 7,752,179 B1
(45) Date of Patent: Jul. 6, 2010

(54) METHOD AND SYSTEM FOR EXTRACTING CONSISTENT DISJOINT SET MEMBERSHIP FROM MULTIPLE INCONSISTENT DATA SOURCES

(75) Inventor: Jeffrey H. Brown, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 526 days.

(21) Appl. No.: 11/361,372

(22) Filed: Feb. 24, 2006

(51) Int. Cl.
*G06F 7/00* (2006.01)
*G06F 17/00* (2006.01)

(52) U.S. Cl. ..................... 707/690; 707/692

(58) Field of Classification Search ............ 707/690, 707/692
See application file for complete search history.

(56) References Cited

OTHER PUBLICATIONS

Baorto et al. "Combining Laboratory Data Sets From Multiple Institutions Using the Logical Observation Identifier Names and Codes (LOINC)", International Journal of Medical Informatics, vol. 51, pp. 29-37, Elsevier Science Ireland Ltd., 1998.*
Rahm et al., "Data Cleaning: Problems and Current Approaches", IEEE Data Engineering Bulletin, 23(4), pp. 1-11, 2000.*
Chatterjee et al., "Rule Based Joins in Heterogeneous Databases", Decision Support Systems 13, pp. 313-333, Elsevier Science, 1995.*

* cited by examiner

*Primary Examiner*—Neveen Abel Jalil
*Assistant Examiner*—Michael J Hicks
(74) *Attorney, Agent, or Firm*—Osha • Liang LLP

(57) ABSTRACT

A method for extracting a consistent set of entity identifiers including associating each of a first plurality of entity identifiers with at least one of a first plurality of GroupIDs, associating each of a second plurality of entity identifiers with at least one of a second plurality of GroupIDs, combining the first plurality of entity identifiers with the second plurality of entity identifiers to generate a third plurality of entity identifiers, where each of the third plurality of entity identifiers is associated with at least one of a third plurality of GroupIDs, linking at least one of the third plurality of GroupIDs with at least one of the first plurality of GroupIDs based on the third plurality of entity identifiers and the first plurality of entity identifiers, removing a contaminated entity identifier from the third plurality of entity identifiers to extract the consistent set of entity identifiers.

34 Claims, 14 Drawing Sheets

| First Datastore (Entity Identifier, GroupID) 1010 | Second Datastore (Entity Identifier, GroupID) 1020 |
|---|---|
| (50,50) | (50,49) |
| (51,50) | (51,50) |
| (52,50) | (52,50) |
|  | (53,50) |
| (60,60) |  |
| (61,60) | (61,61) |
| (62,60) | (63,61) |
| (69,69) | (69,69) |
| (70,69) | (70,69) |
| (71,69) | (71,69) |

FIGURE 10

METHOD AND SYSTEM FOR EXTRACTING CONSISTENT DISJOINT SET MEMBERSHIP FROM MULTIPLE INCONSISTENT DATA SOURCES

BACKGROUND

In any given corporate, non-profit, government, or academic organization, individuals and entities associated with the organization (e.g., customers, clients, employees, shareholders, suppliers, donors, students, contractors, products, merchandise, inventory goods, etc.) may be electronically registered by the organization. The organization may maintain one or more records associated with each registered individual or entity. The systems responsible for performing the registration may assign each of these individuals and entities a unique entity identifier. The unique entity identifier may be an identification number, an email address, or any type of string, label, or value that can be lexicographically ordered. For example, an entity identifier may be a customer number. These entity identifiers may be kept in a datastore, such as a flat file or a database on a CD, hard drive, disk, tape, or any other electronically readable medium well known in the art. Further, at the beginning of each new calendar or fiscal year, a new datastore may be created to hold the entity identifiers of the individuals and entities associated with the organization during the new year.

It is often the case that within a given datastore, a single individual or entity may be assigned multiple entity identifiers. The datastore may associate the multiple entity identifiers pertaining to the single individual or entity by grouping these entity identifiers into a set. In other words, a set would contain all of the multiple entity identifiers pertaining to a given individual or entity. While it may be permissible for a single entity to have multiple entity identifiers, it is not permissible for an entity identifier to denote more than one entity. Thus, the aforementioned sets should be disjoint. However, those skilled in the art will appreciate that during the grouping process, a race condition may create more than one set for a given individual or entity. Each of these sets may either correctly associate all of the multiple entity identifiers for the given individual or entity, or may exclude some of the multiple entity identifiers, and thus only associate a subset of all the multiple entity identifiers.

As discussed above, this grouping process occurs within each datastore. Although a given individual or entity may be registered in two or more datastores (e.g., each datastore being associated with a different fiscal year), it is often the case that the sets resulting from the grouping process in each of the datastores differ. Further, between the two or more datastores, there may be both common and different entity identifiers representing the same individual or entity.

SUMMARY

In general, in one aspect, the invention relates to a computer implemented method for extracting a consistent set of entity identifiers including obtaining a first plurality of entity identifiers, obtaining a second plurality of entity identifiers, associating each of the first plurality of entity identifiers with at least one of a first plurality of GroupIDs, associating each of the second plurality of entity identifiers with at least one of a second plurality of GroupIDs, linking at least one of the first plurality of GroupIDs with at least one of the second plurality of GroupIDs based on the first plurality of entity identifiers and the second plurality of entity identifiers, removing a contaminated entity identifier from at least one selected from the group consisting of the first plurality of entity identifiers and the second plurality of entity identifiers, where the contaminated entity identifier is identified during the linking, and combining the first plurality of entity identifiers with the second plurality of entity identifiers following the removal of the contaminated entity identifier to extract the consistent set of entity identifiers.

In general, in one aspect, the invention relates to a computer implemented method for extracting a consistent set of entity identifiers including obtaining a first plurality of entity identifiers, obtaining a second plurality of entity identifiers, associating each of the first plurality of entity identifiers with at least one of a first plurality of GroupIDs, associating each of the second plurality of entity identifiers with at least one of a second plurality of GroupIDs, combining the first plurality of entity identifiers with the second plurality of entity identifiers to generate a third plurality of entity identifiers, where each of the third plurality of entity identifiers is associated with at least one of a third plurality of GroupIDs, linking at least one of the third plurality of GroupIDs with at least one of the first plurality of GroupIDs based on the third plurality of entity identifiers and the first plurality of entity identifiers, removing a contaminated entity identifier from the third plurality of entity identifiers based on the linking to extract the consistent set of entity identifiers.

In general, in one aspect, the invention relates to a computer readable medium containing instructions for extracting a consistent set of entity identifiers, the instructions comprising functionality to obtain a first plurality of entity identifiers, obtain a second plurality of entity identifiers, associate each of the first plurality of entity identifiers with at least one of a first plurality of GroupIDs, associate each of the second plurality of entity identifiers with at least one of a second plurality of GroupIDs, link at least one of the first plurality of GroupIDs with at least one of the second plurality of GroupIDs based on the first plurality of entity identifiers and the second plurality of entity identifiers, removing a contaminated entity identifier from at least one selected from the group consisting of the first plurality of entity identifiers and the second plurality of entity identifiers, where the contaminated entity identifier is identified during the linking, and combine the first plurality of entity identifiers with the second plurality of entity identifiers following the addition of the contaminated entity identifier to extract the consistent set of entity identifiers.

In general, in one aspect, the invention relates to a computer readable medium for extracting a consistent set of entity identifiers, the instructions comprising functionality to obtain a first plurality of entity identifiers, obtain a second plurality of entity identifiers, associate each of the first plurality of entity identifiers with at least one of a first plurality of GroupIDs following the removal of the first entity identifier, associate each of a second plurality of entity identifiers with at least one of a second plurality of GroupIDs, combine the first plurality of entity identifiers with the second plurality of entity identifiers to generate a third plurality of entity identifiers, where each of the third plurality of entity identifiers is associated with at least one of a third plurality of GroupIDs, link at least one of the third plurality of GroupIDs with at least one of the first plurality of GroupIDs based on the third plurality of entity identifiers and the first plurality of entity identifiers, remove a contaminated entity identifier from the third plurality of entity identifiers based on the linking to extract the consistent set of entity identifiers.

Other aspects of the invention will be apparent from the following description and the appended claims.

BRIEF DESCRIPTION OF DRAWINGS

FIG. 10 shows two datastores, each with multiple entity identifiers and GroupIDs in accordance with one or more embodiments of the invention

DETAILED DESCRIPTION

Figure 1:
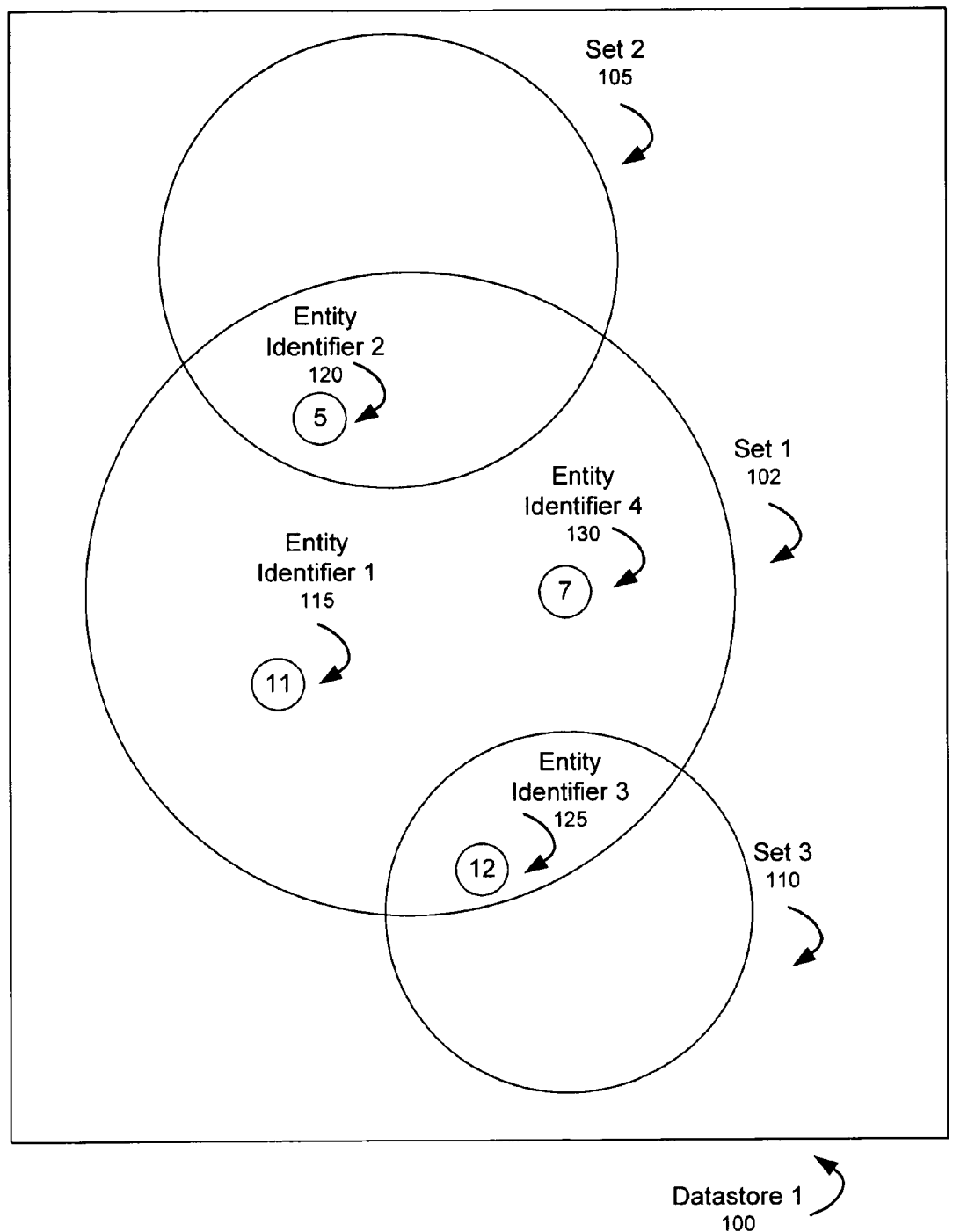
FIG. 1 shows a datastore storing multiple entity identifiers in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus to extract a consistent set of entity identifiers from multiple inconsistent sources. Specifically, embodiments of the invention provide a method and apparatus to extract the consistent set of entity identifiers by associating each entity identifier with a GroupID and linking the GroupIDs in one source with GroupIDs in another source.

FIG. 1 shows a datastore storing multiple entity identifiers in accordance with one or more embodiments of the invention. As shown in FIG. 1, a datastore (Datastore 1 (100)) stores multiple entity identifiers (Entity Identifier 1 (115), Entity Identifier 2 (120), Entity Identifier 3 (125), and Entity Identifier 4 (130)). As discussed above, each entity identifier is unique and may be an identification number, an email address, or any type of string, label, or value that can be lexicographically ordered. For example, Entity Identifier 1 (115) has a value 11 and Entity Identifier 4 (130) has a value of 7. The grouping process has placed these multiple entity identifiers into sets (Set 1 (102), Set 2 (105), and Set 3 (110)). Those skilled in the art will appreciate that each set may also have a unique identification value (not shown). Set 1 (102) contains all of the entity identifiers (Entity Identifier 1 (115), Entity Identifier 2 (120), Entity Identifier 3 (125), Entity Identifier 4 (130)). This grouping indicates all of these entity identifiers pertain to the same individual or entity. Set 2 (105) only contains Entity Identifier 2 (120). Accordingly, this grouping indicates only Entity Identifier 2 (120) pertains to the individual or entity. Set 3 (110) only contains Entity Identifier 3 (125). Accordingly, this grouping indicates only Entity Identifier 3 (125) pertains to the given individual or entity.

Figure 2:
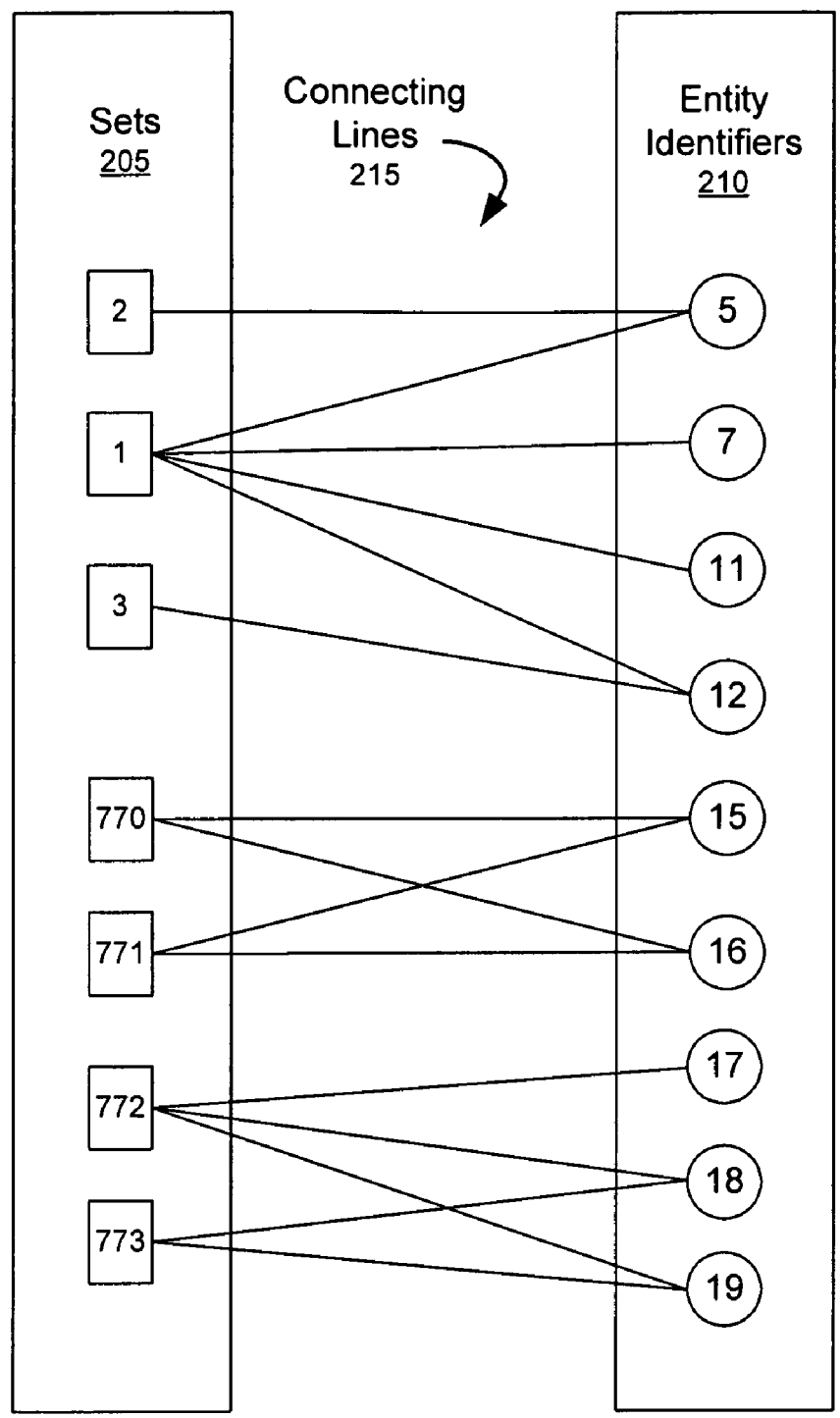
FIG. 2 shows multiple entity identifiers and multiple sets in accordance with one or more embodiments of the invention.

FIG. 2 shows multiple entity identifiers and multiple sets in accordance with one or more embodiments of the invention. Each value in the first column (Sets (205)) uniquely identifies a set (i.e., Set 1, Set 2, Set 3, Set 770, Set 771, Set 772, Set 773). Each value in the second column (Entity Identifiers (210)) is an entity identifier. The lines (Connecting Lines (215)) connecting the first column (Sets (205)) and the second column (Entity Identifiers (210)) show the entity identifiers that belong to each set. For example, the entity identifier of value 5, the entity identifier of value 7, the entity identifier of value 11, and the entity identifier of value 12 all belong to Set 1. Accordingly, this grouping indicates the entity identifier of value 5, the entity identifier of value 7, the entity identifier of value 11, and the entity identifier of value 12 all pertain to the same individual or entity. Similarly, Set 772 contains the entity identifier of value 17, the entity identifier of value 18, and the entity identifier of value 19. Accordingly, this grouping indicates the entity identifier of value 17, the entity identifier of value 18, and the entity identifier of value 19 all pertain to the same individual or entity. Further, Set 771 contains the entity identifier of value 15 and the entity identifier of value 16. Accordingly, this grouping indicates the entity identifier of value 15 and the entity identifier of value 16 pertain to the same individual or entity.

Figure 3:
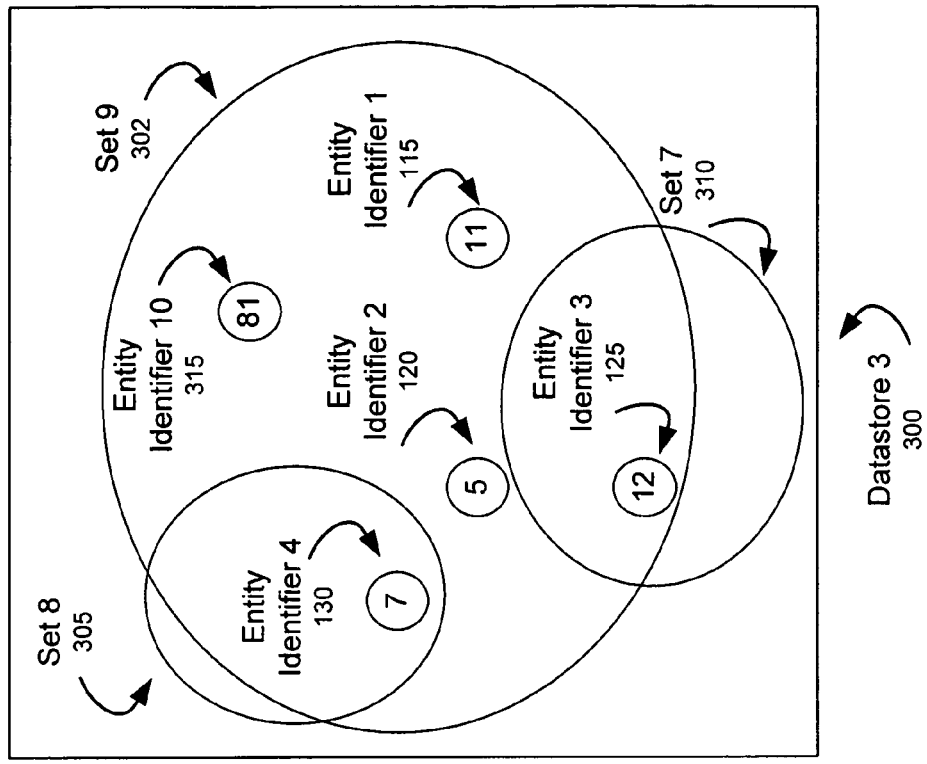
FIG. 3 shows two datastores each holding multiple entity identifiers in accordance with one or more embodiments of the invention.
Figure 3:
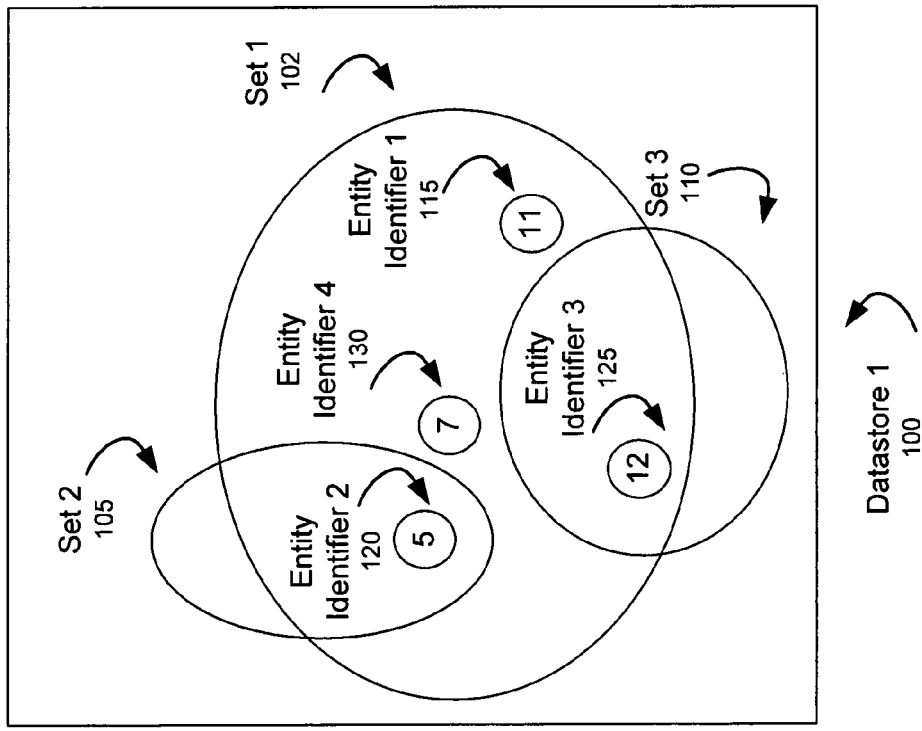

FIG. 3 shows two datastores each holding multiple entity identifiers in accordance with one or more embodiments of the invention. In one or more embodiments of the invention, each datastore may pertain to a different fiscal year. As shown in FIG. 3, Datastore 1 (100) stores multiple entity identifiers (Entity Identifier 1 (115), Entity Identifier 2 (120), Entity Identifier 3 (125), and Entity Identifier 4 (130)) and Datastore 3 (300) stores multiple entity identifiers (Entity Identifier 1 (115), Entity Identifier 3 (125), Entity Identifier 4 (130), Entity Identifier 2 (120), and Entity Identifier 10 (315)). Those skilled in the art will appreciate Entity Identifier 1 (115), Entity Identifier 2 (120), Entity Identifier 3 (125), and Entity Identifier 4 (130) exist in both Datastore 1 (100) and Datastore 3 (300). Those skilled in the art will also appreciate that Entity Identifier 10 (315) is only found in Datastore 3 (300).

Still referring to FIG. 3, the grouping process has placed the entity identifiers stored in each datastore into sets (Set 1 (102), Set 2 (105), Set 3 (110), Set 7 (310), Set 8 (305), and Set 9 (302)). Those skilled in the art will appreciate that despite common entity identifiers (Entity Identifier 1 (115), Entity Identifier 2 (120), Entity Identifier 3 (125), and Entity Identifier 4 (130)) existing in both datastores (Datastore 1 (100) and Datastore 3 (300)), the sets resulting from the grouping process in each datastore are different. For example, in Datastore 1 (100), Set 2 (105) contains only Entity Identifier 2 (120). In Datastore 3 (300), no set contains only Entity Identifier 2 (120).

Those skilled in the art will appreciate that the grouping process discussed above may have been performed by an automatic means, such as a software component internal or external to the datastore, or by a user with access to the datastore through an interface, such as a graphical user interface (GUI).

Figure 4:
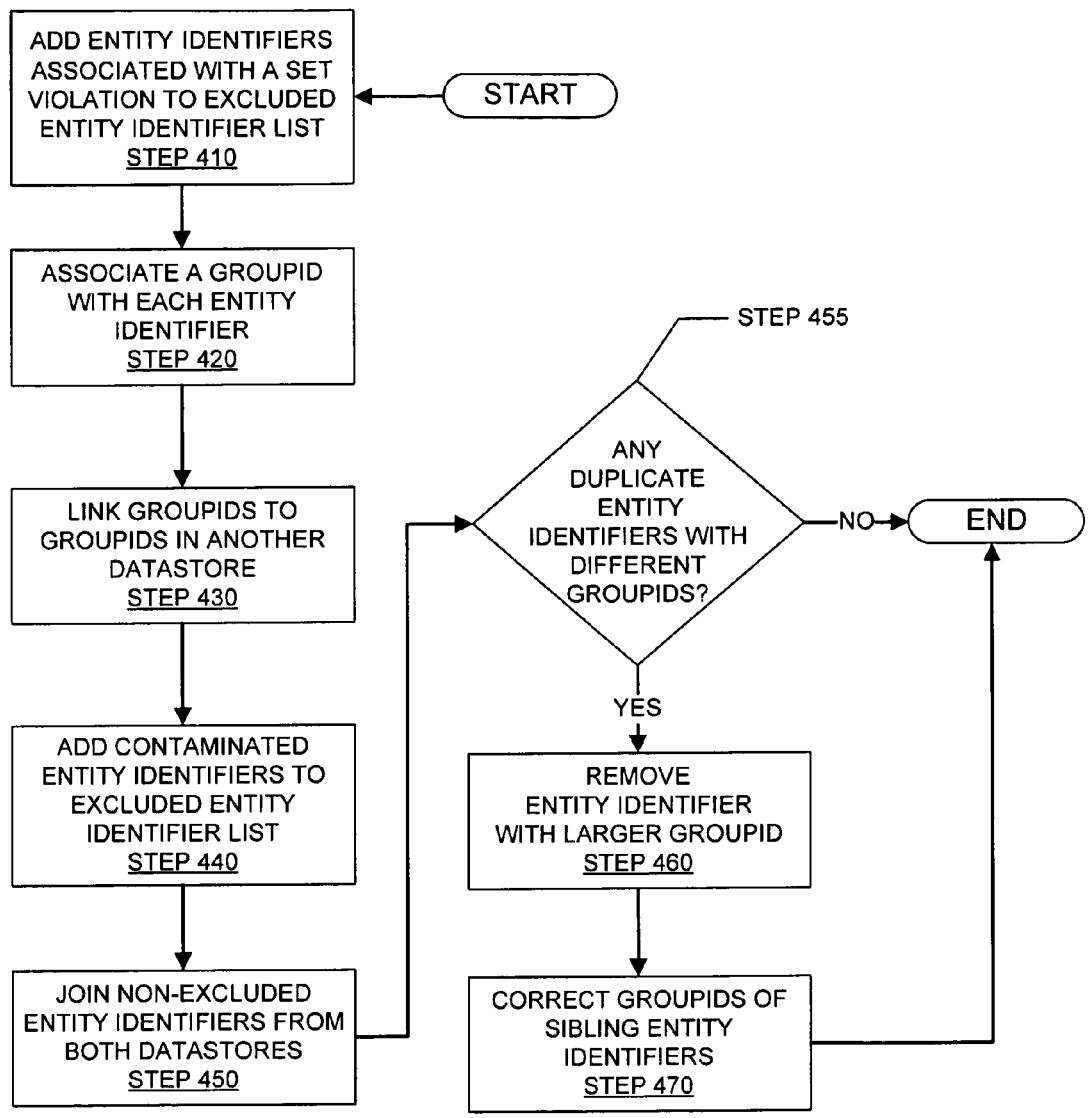
FIG. 4 shows a flowchart in accordance with one or more embodiments of the invention.

FIG. 4 shows a flow chart in accordance with one or more embodiments of the invention. In one or more embodiments, the process shown in FIG. 4 is performed with only two datastores. This process extracts only consistent sets of entity identifiers from multiple, possibly inconsistent, sources. In other words, any entity identifier associated with a set violation (discussed below), or any entity identifier marked as contaminated (discussed below) will not be contained within an extracted set following the process shown in FIG. 4. Each step that follows is discussed in greater detail below.

In STEP 410, every entity identifier that is associated with a set violation is added to an excluded entity identifier list. In STEP 420, each entity identifier is associated with a GroupID. A datastore in which both STEP 410 and STEP 420 have been performed may be considered a resolved datastore. In STEP 430, the GroupIDs of one datastore are linked to the GroupIDs of another datastore. In STEP 440, any contaminated entity identifiers are added to the excluded entity identifier list. This step effectively removes the contaminated identifiers from being included in the following join operation. In STEP 450, the entity identifiers in each datastore that are not in the excluded entity identifier list are joined. Following the join operation (STEP 450), if entity identifiers of equal value associated with different GroupIDs exist (STEP 455), a GroupID minimization process is carried out (STEP 460 and STEP 470). Otherwise, the process ends. Together STEP 450, STEP 455, STEP 460, and STEP 470 may be considered the steps needed to combine the entity identifiers from the datastores.

Those skilled in the art will appreciate that the excluded entity identifier list discussed above may be any type of data structure, including a list, an array, a n-tuple, a binary tree, or any other similar datastore known to those skilled in the art.

Figure 5A:
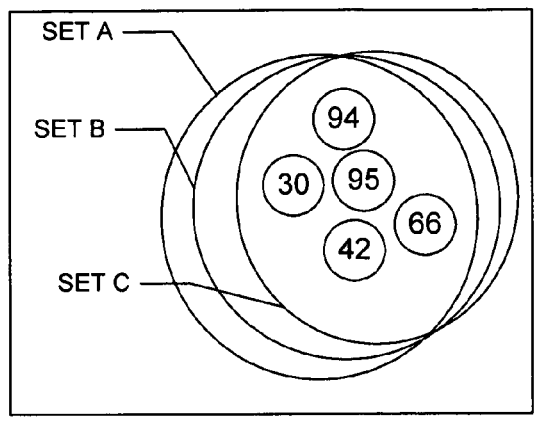
FIG. 5A, FIG. 5B, FIG. 5C, and FIG. 5D show datastores with multiple entity identifiers in accordance with one or more embodiments of the invention.
Figure 5B:
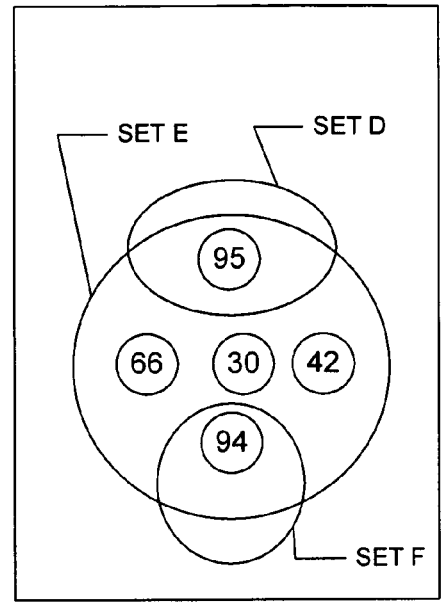
Figure 5C:
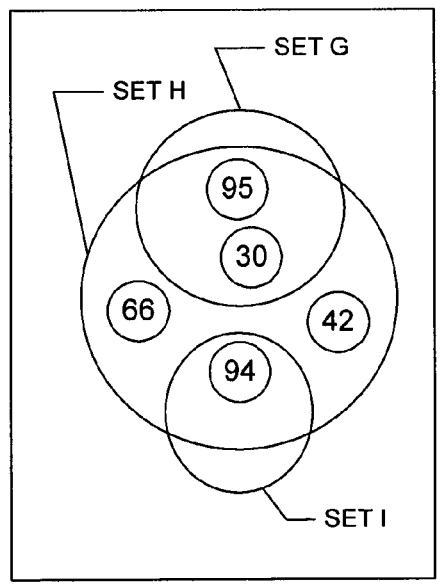
Figure 5D:
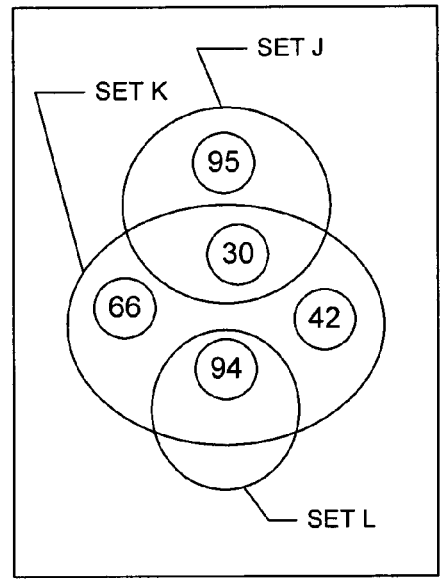

As discussed above, in the initial step, entity identifiers associated with a set violation are added to an excluded entity identifier list (STEP 410). A set violation is local to a datastore and may exist when the grouping process determines that two or more sets pertain to the same individual or entity, but the two or more sets are not identical and at least two of the sets contain two or more entity identifiers. For example, consider FIG. 5A, FIG. 5B, FIG. 5C, and FIG. 5D which all show five entity identifiers (i.e., entity identifiers of values 30, 95, 94, 42, 66) and three sets. In FIG. 5A, all three sets (Set A, Set B, Set C) are identical (i.e., all sets contain the same entity identifiers). Accordingly, no set violation exists. In FIG. 5B, the sets (Set D, Set E, Set F) are not identical, but no two (or more) sets contain two (or more) entity identifiers. Accordingly, no set violation exists. In FIG. 5C, the sets (Set G, Set H, Set I) are not identical, but two sets contain two or more entity identifiers. Accordingly, a set violation does exist. In FIG. 5D, the sets (Set J, Set K, Set L) are not identical, but two sets contain two or more entity identifiers. Accordingly, a set violation does exist. In the case of FIG. 5C and FIG. 5D, all five of the entity identifiers are considered associated with the set violation. Those skilled in the art will appreciate other definitions may exist for set violations. For example, a datastore that contains one or more set violations may be considered an inconsistent source. Those skilled in the art will also appreciate that if it is known no set violations exist within a source (e.g., the datastore is a consistent source), STEP 410 may be omitted.

Referring back to FIG. 4, in STEP 420, each of the entity identifiers is associated with a GroupID. In one or more embodiments of the invention, the GroupID for a given entity identifier may be determined by comparing the entity identifier with all of its siblings. In one or more embodiments of the invention, the entity identifier of smallest value (e.g., by numerical or lexicographical order) among its siblings may be designated the GroupID. Those skilled in the art will appreciate in one or more embodiments of the invention, the entity identifier of greatest value (e.g., by numerical or lexicographical order) among its siblings may be designated the GroupID.

Figure 6:
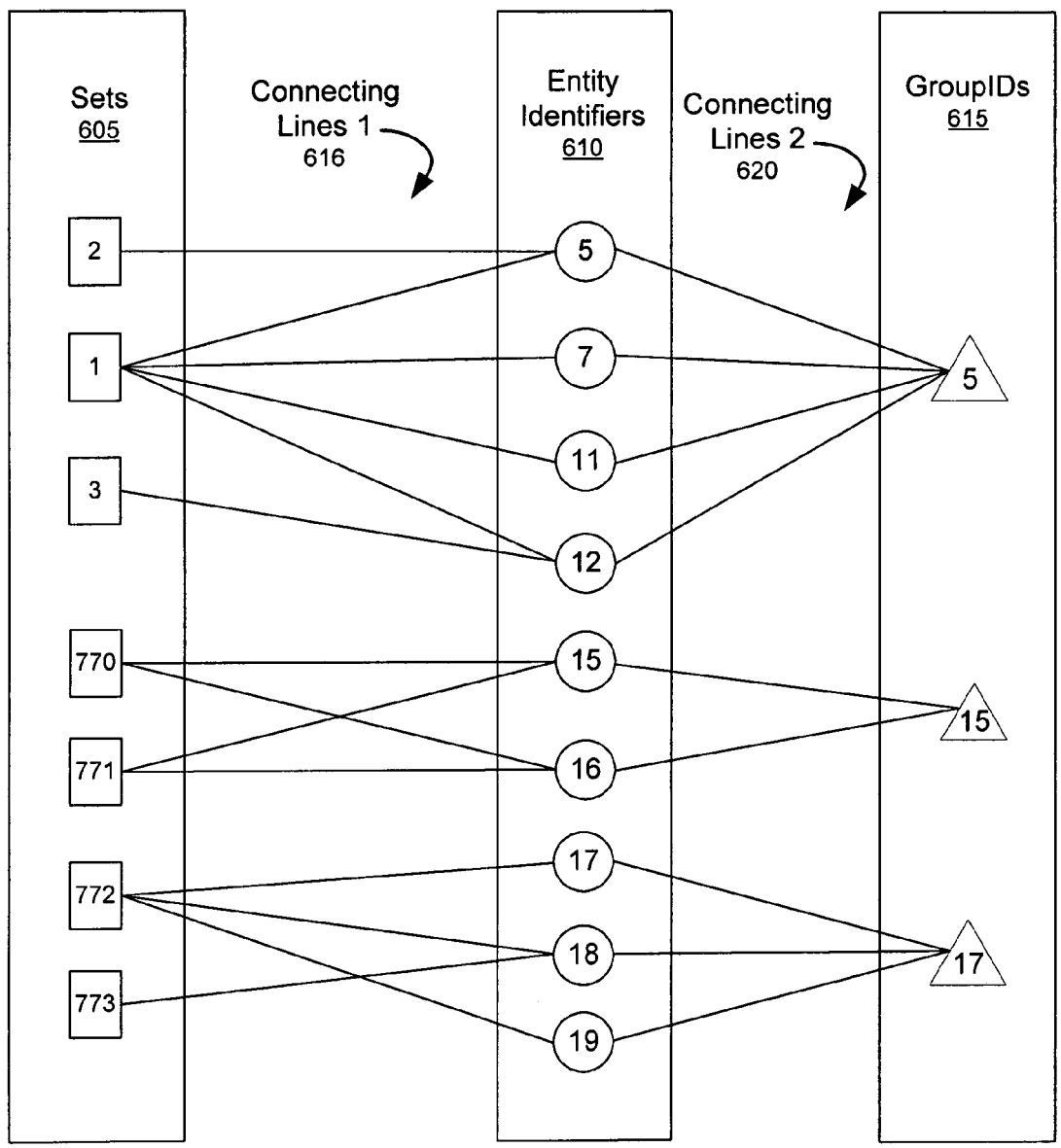
FIG. 6 shows multiple sets, multiple entity identifiers, and multiple GroupIDs in accordance with one or more embodiments of the invention

For example, consider FIG. 6, which shows multiple sets, multiple entity identifiers, and multiple GroupIDs in accordance with one or more embodiments of the invention. Each value in the first column (Sets (605)) uniquely identifies a set (i.e., Set 1, Set 2, Set 3, Set 770, Set 771, Set 772, Set 773). Each value in the second column (Entity Identifiers (610)) is an entity identifier. The lines (Connecting Lines 1 (616)) connecting the first column (Sets (605)) and the second column (Entity Identifiers (610)) show the entity identifiers that belong to each set. The third column (GroupIDs (615)) lists the GroupIDs. The lines (Connecting Lines 2 (620)) connecting the second column (Entity Identifiers (610)) and the third column (GroupIDs (615)) show the GroupID associated with each entity identifier.

As shown in FIG. 6, Set 1 contains the entity identifier of value 5, the entity identifier of value 7, the entity identifier of value 11, and the entity identifier of value 12. Accordingly, the entity identifier of value 5, the entity identifier of value 7, the entity identifier of value 11, and the entity identifier of value 12 are siblings because the entity identifiers belong to the same set (Set 1). The sibling with the smallest value is the entity identifier of value 5. Thus, the smallest value entity identifier among the siblings is the entity identifier of value 5. Accordingly, 5 is the GroupID associated with the entity identifier of value 5 and all its siblings.

In a similar fashion, the entity identifier of value 17, the entity identifier of value 18, and the entity identifier of value 19 are all siblings because they belong to the same set (Set 772). The sibling with the smallest value is the entity identifier of value 17. Thus, the smallest value entity identifier among the siblings is the entity identifier of value 17. Accordingly, 17 is the GroupID associated with the entity identifier of value 17 and all its siblings.

Still referring to FIG. 6, the entity identifier of value 15 and the entity identifier of value 16 are siblings because they belong to the same sets (Set 770 or Set 771). The sibling with the smallest value is the entity identifier of value 15. Thus, the smallest value entity identifier among the siblings is the entity identifier of value 15. Accordingly, 15 is the GroupID associated with the entity identifier of value 15 and all its siblings.

Figure 7:
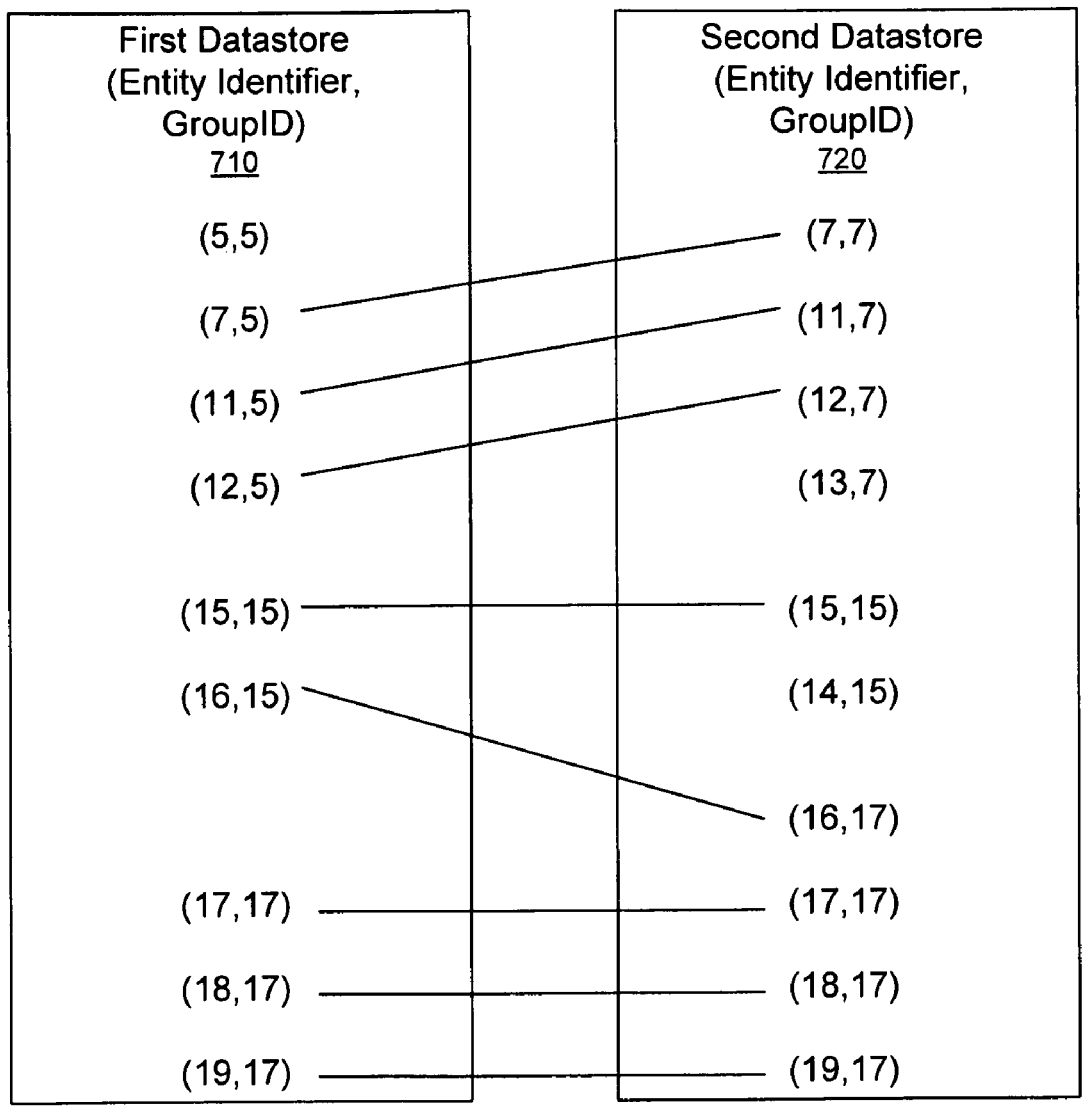
FIG. 7 shows the linking process in accordance with one or more embodiments of the invention.

Referring back to FIG. 4, once each entity identifier has been associated with a GroupID (STEP 420), the GroupIDs of one datastore may be linked with the GroupIDs of another datastore (STEP 430). As shown in FIG. 7, two datastores (First Datastore (710) and Second Datastore (720)) each contain multiple entity identifiers. Each of the multiple entity identifiers is associated with a GroupID. In one or more embodiments of the invention, an entity identifier and its associated GroupID are represented using an ordered pair. The first element of the ordered pair is the entity identifier and the second element of the ordered pair is the GroupID. For example, the ordered pair (7,5) represents the entity identifier of value 7 associated with GroupID 5. Those skilled in the art will appreciate that while an ordered pair is described above, other representations are possible.

Two GroupIDs from two separate datastores are considered linked if each of the two GroupIDs is associated with a common entity identifier. For example, ordered pair (7,5) of the First Datastore (710) and ordered pair (7,7) of the Second Datastore (720) are both representatives of the entity identifier of value 7. The entity identifier of value 7 is the common entity identifier. Accordingly, GroupID 5 in the First Datastore (710) is linked with GroupID 7 in the Second Datastore (720). In a similar fashion, ordered pair (19,17) of the First Datastore (710) and ordered pair (19,17) of the Second Datastore (720) are both representatives of the entity identifier of value 19. The entity identifier of value 19 is the common entity identifier. Accordingly, GroupID 17 of the First Datastore (710) is linked with GroupID 17 of the Second Datastore (720).

As discussed above, two GroupIDs from two separate datastores are considered linked if each of the two GroupIDs is associated with a common entity identifier. In one or more embodiments of the invention, a linking policy may require a GroupID of First Datastore (710) be linked to only one GroupID of Second Datastore (720). Similarly, the same linking policy may require a GroupID of Second Datastore (720) be linked to only one GroupID of First Datastore (710). Any identifiers associated with a GroupID that violates this linking policy may be marked as contaminated.

For example, still referring to FIG. 7, ordered pair (15,15) of the First Datastore (710) and ordered pair (15,15) of the Second Datastore (720) are both representatives of the entity identifier of value 15. The entity identifier of value 15 is the common entity identifier. Accordingly, GroupID 15 of the First Datastore (710) is linked with GroupID 15 of the Second Identifier (720). However, ordered pair (16, 15) of the First Datastore (710) and ordered pair (16, 17) of the Second Datastore (720) are both representatives of the entity identifier of value 16. The entity identifier of value 16 is the common entity identifier. Accordingly, GroupID 15 of the First Datastore (710) is also linked to GroupID 17 of the Second Datastore (720). This is a violation of the linking policy. All entity identifiers associated with these GroupIDs are marked as contaminated. In other words, the entity identifiers represented by ordered pairs (15,15), (16,15), (17,17), (18,17), and (19,17) in First Datastore (710) and the entity identifiers represented by ordered pairs (15,15), (14,15), (16,17), (17, 17), (18,17), and (19,17) of Second Datastore (720) are marked as contaminated.

Still referring to FIG. 4, in Step 440, all contaminated entity identifiers are added to the excluded entity identifier list. This step effectively removes the contaminated identifiers from being included in the following join operation. In STEP 450, the entity identifiers (from all resolved datastores) that are not on the excluded entity identifier list are joined. In one or more embodiments of the operation, the join operation involves placing the identifiers from all resolved datastores into an intermediate entity identifier list and removing any repetitive entries (i.e., entries that are identical in both entity identifier and GroupID). For example, ordered pairs (8,5) and (8,5) are repetitive entries. Both ordered pairs represent the entity identifier of value 8 associated with GroupID 5. Accordingly, one of these two entries would be removed from the intermediate entity identifier list.

Those skilled in the art will appreciate the intermediate entity identifier list discussed above may be any type of data structure including, a list, an n-tuple, a binary tree, or any other similar datastore known to those skilled in the art.

Following the join operation (STEP 450), a determination is made whether any entity identifiers appear more than once in the intermediate entity identifier list but are associated with different GroupIDs (STEP 455). If such entity identifiers do exist, a GroupID minimization operation may be performed on the entity identifiers (STEP 460 and STEP 470). In STEP 460, the lowest GroupID entity identifier (i.e., the entity identifier associated with the lowest GroupID) may be kept, while the equivalent entity identifiers associated with larger GroupIDs are removed. For example, if ordered pairs (11,98) and (11,55) exist in the intermediate entity identifier list following the join operation (STEP 450), ordered pair (11,55) is kept and ordered pair (11,98) is removed.

Entity identifiers associated with the same GroupID may be considered siblings. In STEP 470, the siblings of these newly removed entity identifiers in the intermediate entity identifier list may be corrected by adjusting the GroupIDs to match the GroupID of the lowest GroupID entity identifier (STEP 470). This correction step (STEP 470) effectively converts the intermediate entity identifier list into the final entity identifier list.

Figure 8:
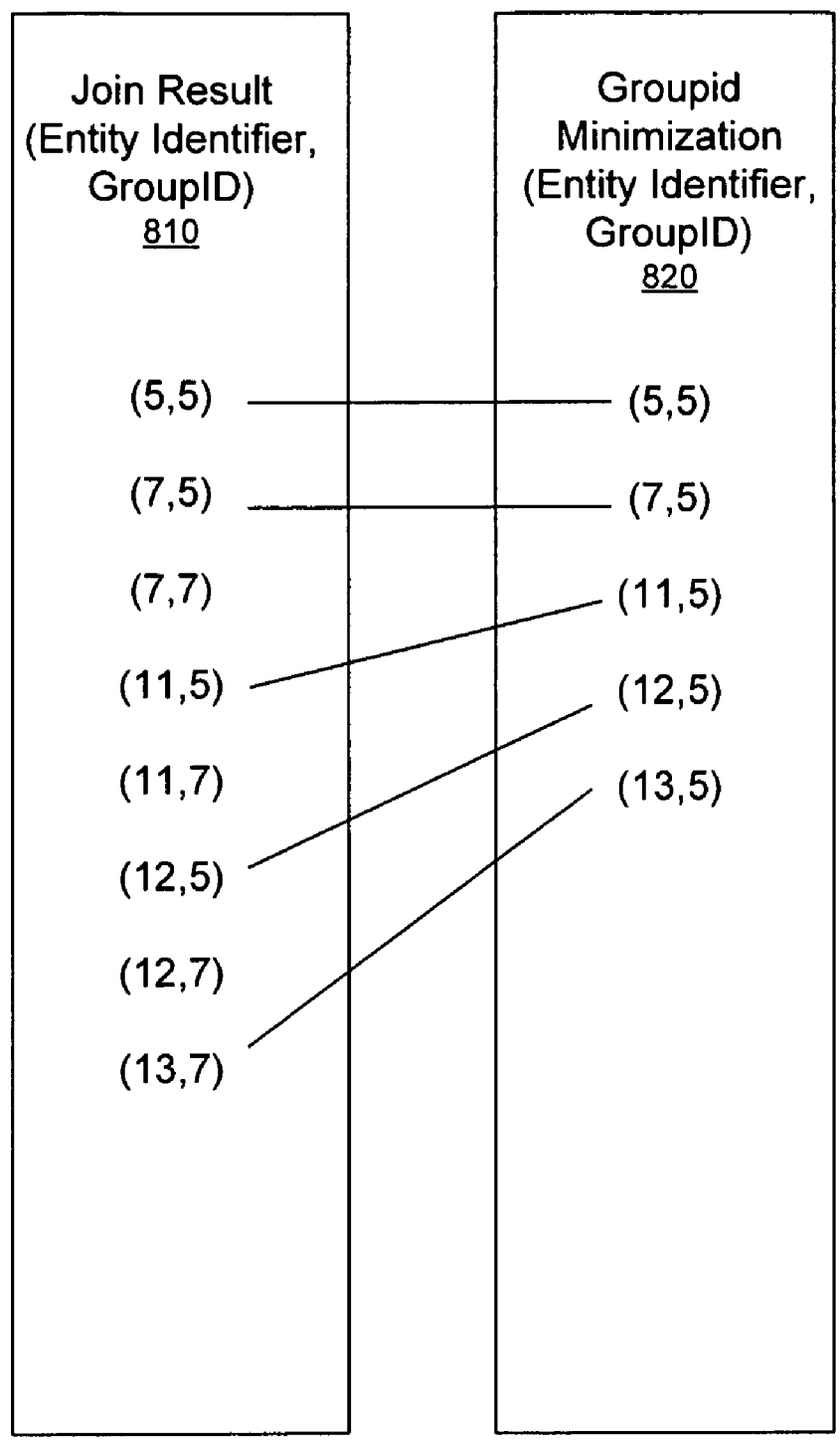
FIG. 8 shows the join operation and GroupID minimization operation in accordance with one or more embodiments of the invention.

For example, consider FIG. 8 which shows the join operation and GroupID minimization operation in accordance with one or more embodiments of the invention. The first column (Join Result (810)) shows the intermediate entity identifier list following a join operation. As discussed above, in one or more embodiments of the invention, each entry in the intermediate entity identifier list is an ordered pair where the first element of the ordered pair is the entity identifier and the second element of the ordered pair is the GroupID associated with the entity identifier. Those skilled in the art will appreciate that while an ordered pair is described above, other representations are possible.

Still referring to FIG. 8, the second column (GroupID Minimization (820)) shows the final entity identifier list following the GroupID minimization operation (STEP 460 and STEP 470). Those skilled in the art will recognize, for example, the ordered pairs (7,7), (11,7), and (12,7) do not appear in the second column (GroupID Minimization (820)). Further, based on the discussion above, ordered pair (12,5) in the first column (Join Result (810)) is an example lowest GroupID entity identifier (i.e, the ordered pair (12,7) has a larger GroupID than ordered pair (12,5)). Accordingly, the ordered pair (12,7) is removed (STEP 460) from the intermediate entity identifier list. The entity identifier represented by ordered pair (13,7) is a sibling of the newly removed entity identifier represented by ordered pair (12,7). Accordingly, ordered pair (13,7) has been adjusted to ordered pair (13,5) to match the GroupID of the lower GroupID entity identifier represented by ordered pair (12,5) (STEP 470).

Those skilled in the art will appreciate the GroupID minimization operation could easily be replaced with a GroupID maximization operation with the result still being extraction of a consistent set of identifiers. In a GroupID maximum operation, the largest GroupID entity identifier (i.e., the entity identifier with largest GroupID) may be kept, while the entity identifiers with equal values but associated with smaller GroupIDs are removed from the intermediate entity identifier list. Further, the siblings of newly removed entity identifiers may be corrected by adjusting the GroupIDs to match the GroupID of the largest GroupID entity identifier.

As discussed above, in one or more embodiments of the invention, the process shown in FIG. 4 extracts only consistent sets of entity identifiers from multiple, possibly inconsistent, sources. In other words, any entity identifier associated with a set violation, or any entity identifier marked as contaminated is not contained within an extracted set following the process shown in FIG. 4. For example, still referring to the second column (GroupID Minimization (820)) in FIG. 8, the process shown in FIG. 4 has determined the entity identifier of value 5, the entity identifier of value 7, the entity identifier of value 11, the entity identifier of value 12, and the entity identifier of value 13 all pertain to the same individual or entity.

As discussed above, an organization may maintain one or more records associated with each individual or entity associated with the organization. In one or more embodiments of the invention, the extracted sets of entity identifiers may be used to determine to which individual or entity an entity identifier pertains, and to then retrieve the one or more records associated with the individual or entity.

Figure 9:
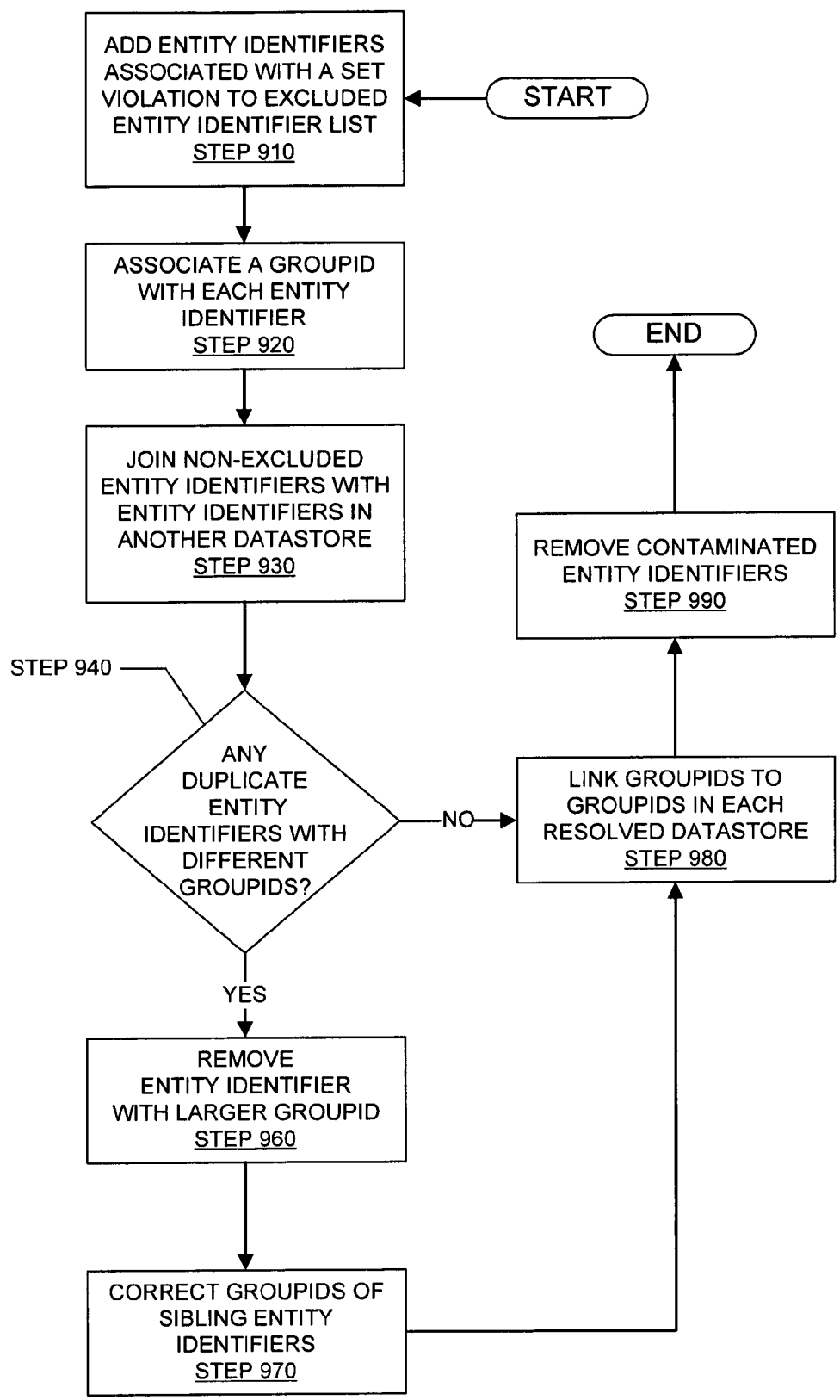
FIG. 9 shows a flowchart in accordance with one or more embodiments of the invention.

FIG. 9 shows a flow chart in accordance with one or more embodiments of the invention. In one or more embodiments of the invention, the process shown in FIG. 9 is performed with two or more datastores. In another embodiment of the invention, the process shown in FIG. 9 is performed with three or more datastores. This process extracts only consistent sets of entity identifiers from multiple, possibly inconsistent, sources. In other words, any entity identifier associated with a set violation, or any entity identifier marked as contaminated is not contained within an extracted set following the process shown in FIG. 9. Each step that follows is discussed in greater detail below.

In STEP 910, any entity identifier associated with a set violation is added to an excluded entity identifier list. Those skilled in the art will appreciate that if it is known no set violations exist within a datastore, STEP 910 may be omitted for that datastore. In STEP 920, each of the entity identifiers is associated with a GroupID. A datastore that has performed both STEP 910 and STEP 920 is referred to as a resolved datastore. In STEP 930, the entity identifiers from all resolved datastores that are not on the excluded entity identifier list are joined to create an intermediate entity identifier list. In STEP 940, a determination is made whether any entity identifiers with identical values, but associated with different GroupIDs, exist in the intermediate entity identifier list. If such identifiers do exist, a GroupID minimization operation is performed (STEP 960 and STEP 970). STEP 930, STEP 940, STEP 960, and STEP 970 may be considered as combining the entity identifiers from the datastores. In STEP 980, the GroupIDs associated with the entity identifiers in the intermediate entity identifier list are linked to the GroupIDs in each and every resolved datastore to determine which, if any, of the entity identifiers in the intermediate entity identifier list are contaminated. Following this linking process, the entity identifiers in the intermediate entity identifier list marked as contaminated are removed (STEP 990). This removal step (STEP 990) effectively converts the intermediate entity identifier list into the final entity identifier list.

As discussed above, the initial step adds entity identifiers associated with a set violation to the excluded entity identifier list (STEP 910). This step is essentially the same as STEP 410 discussed above in reference to FIG. 4. In STEP 920, the entity identifiers in each datastore are associated with a GroupID. This step is essentially the same as STEP 420 discussed above in reference to FIG. 4. In STEP 930, all entity identifiers not on the excluded entity identifier list datastores are joined. In one or more embodiments of the invention, the join operation involves placing all the identifiers from all resolved datastores into an intermediate entity identifier list and removing any repetitive entries.

In one or more embodiments of the invention, an ordered pair is used to represent each of the identifiers in the intermediate entity identifier list. The first element of the ordered pair may represent the value of the entity identifier and the second element of the ordered pair may represent the GroupID associated with the entity identifier. Those skilled in the art will appreciate that while an ordered pair is described above, other representations are possible.

Following the join operation (STEP 930), a determination is made whether the intermediate entity identifier list contains two or more equal entity identifiers that are associated with different GroupIDs (STEP 940). This step is essentially the same as STEP 455 discussed above in reference to FIG. 4. If such entity identifiers do exist in the intermediate entity identifier list, a GroupID minimization operation is performed (STEP 960 and STEP 970). STEP 960 and STEP 970 are essentially the same as STEP 460 and STEP 470, respectively, discussed above in reference to FIG. 4.

Those skilled in the art will appreciate that in one or more embodiments of the invention, a group maximization operation as discussed above in reference to FIG. 4 may be used as an alternative to the group minimization operation.

In STEP 980, the intermediate entity identifier list resulting from the join operation (STEP 930) or the GroupID minimization operation (STEP 960 and STEP 970) is linked with each resolved datastore to identify contaminated entity identifiers. The linking process is essentially the same as STEP 430 discussed above in reference to FIG. 4, except the intermediate entity identifier list is linked to each resolved datastore, one resolved datastore at a time, to mark identifiers as contaminated. In STEP 990, the entity identifiers marked as contaminated are removed. This removal step (STEP 990) effectively converts the intermediate entity identifier list into the final entity identifier list.

In one or more embodiments of the invention, following a linking of the intermediate entity identifier list with one of the resolved datastores, the contaminated entity identifiers are removed prior to linking the intermediate entity identifier list with the next resolved datastore.

Consider, for example, FIG. 10, which shows two datastores (First Datastore (1010), Second Datastore (1020)) each with multiple entity identifiers and GroupIDs in accordance with one or more embodiments of the invention. While this example only shows two datastores, it should not limit the invention to only this embodiment. The invention may be used with any number of datastores. Both First Datastore (1010) and Second Datastore (1020) are resolved datastores. Each identifier in the datastores is represented by an ordered pair. The first element of the ordered pair is the entity identifier and the second element of the ordered pair is the GroupID associated with the entity identifier.

Figure 11:
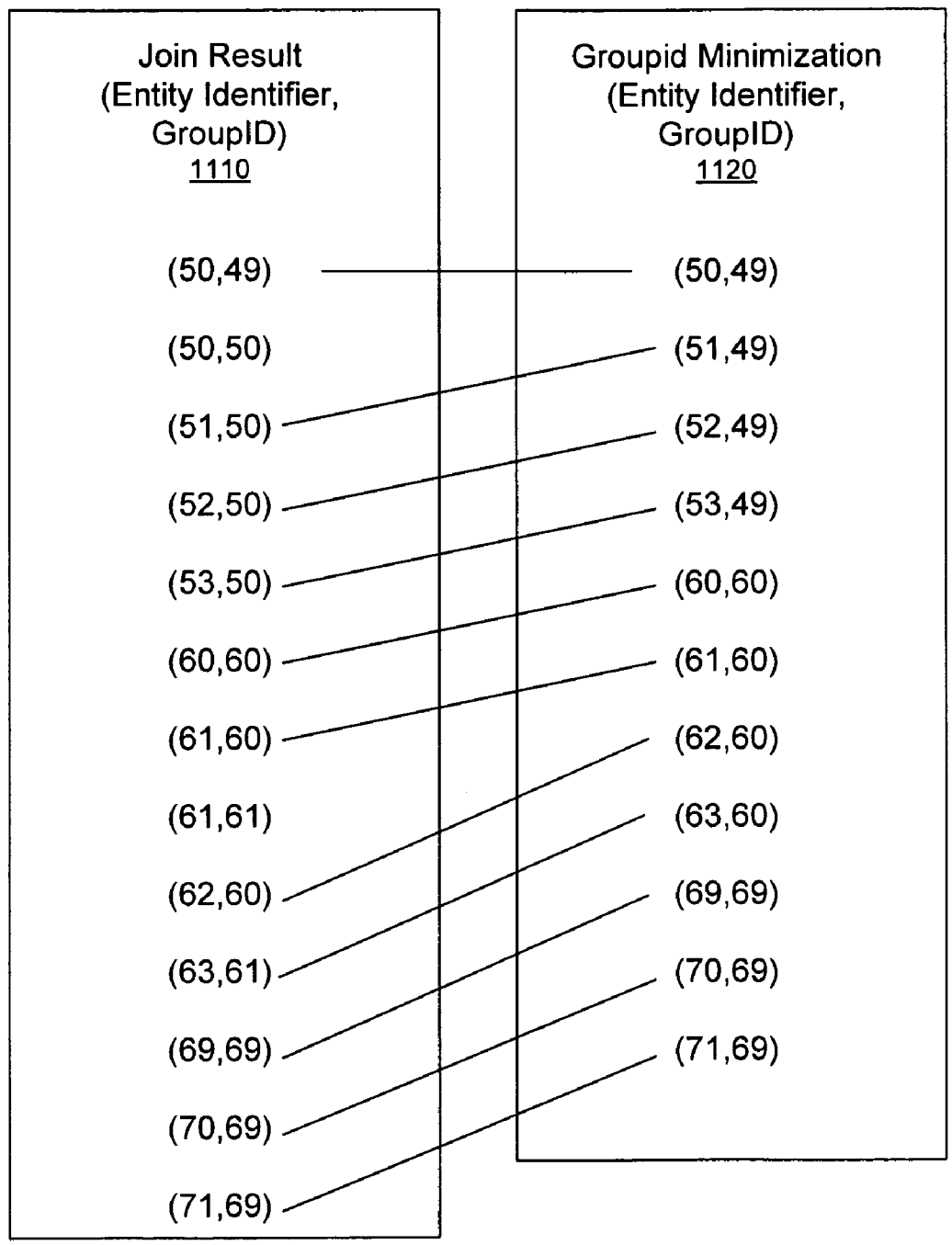
FIG. 11 shows the join operation and GroupID minimization operation in accordance with one or more embodiments of the invention.

FIG. 11 shows the join operation and GroupID minimization operation in accordance with one or more embodiments in the invention. The first column (Join Result (1110)) is the intermediate entity identifier list that results following the join operation to the First Datastore (1010) and Second Datastore (1020). The second column (GroupID Minimization (1120)) is the result of applying the GroupID minimization operation to the first column (Join Result (1110)). Those skilled in the art will recognize, for example, the entity identifier represented by ordered pair (50,50) does not appear in the second column (GroupID Minimization (1120)) and the identifier represented by ordered pair (51,50), which is a sibling of the identifier represented by ordered pair (50,50), appears as ordered pair (51,49) in the second column.

Figure 12:
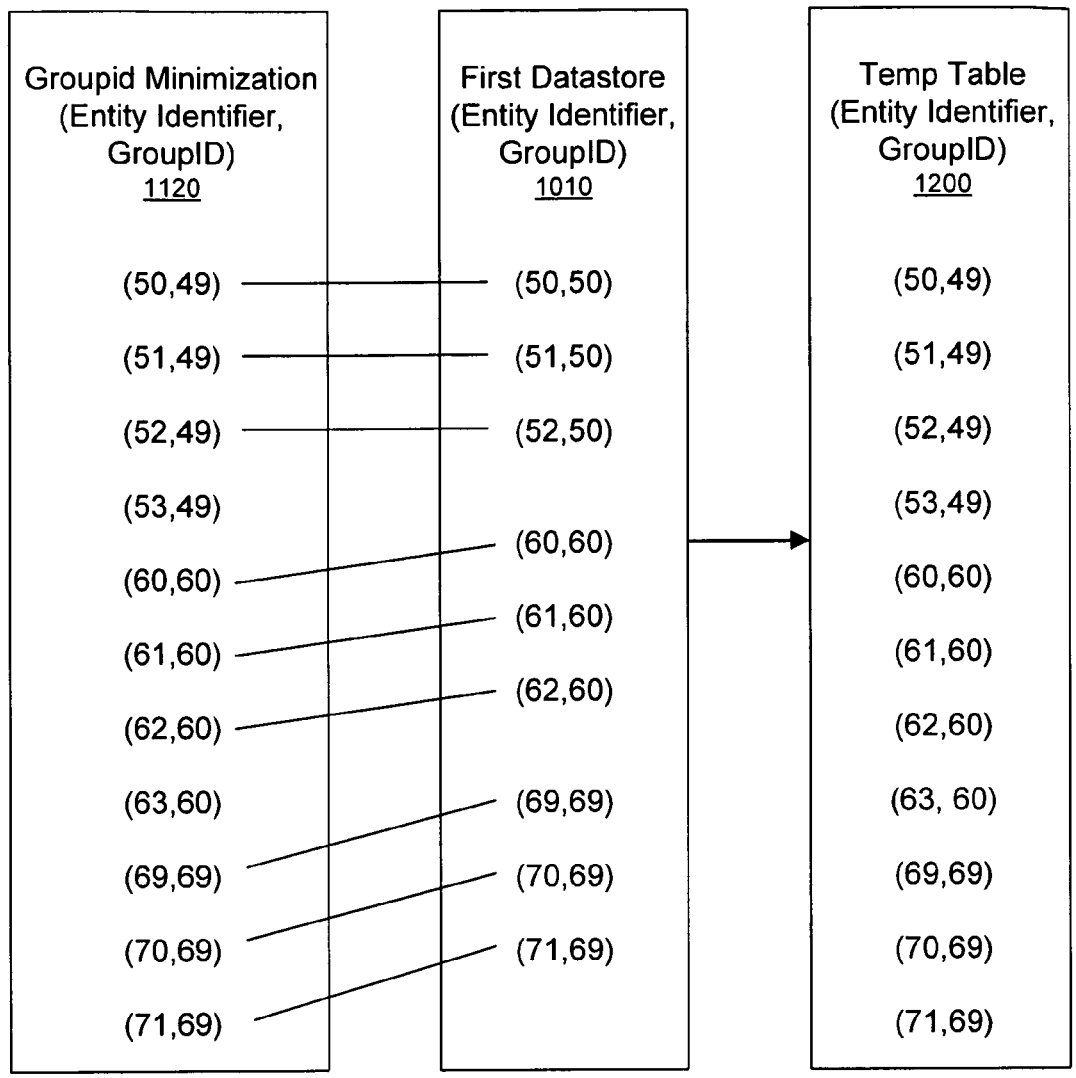
FIG. 12 and FIG. 13 show the linking process in accordance with one or more embodiments of the invention.

FIG. 12. shows the linking process in accordance with one or more embodiments of the invention. The first column in FIG. 12 (GroupID Minimization (1120)) is the intermediate entity identifier list following the application of the GroupID minimization operation as discussed above in reference to FIG. 11. As shown in FIG. 12, the first column (GroupID Minimization (1120)) is linked with First Datastore (1010), where the linking process is essentially the same as discussed above referring to FIG. 4. The third column (Temp Table (1200)) represents the intermediate entity identifier list following the linking process with First Datastore (1010) and the removal of any entity identifiers in the intermediate entity identifier list marked as contaminated. Those skilled in the art will recognize no entity identifiers have been marked as contaminated during the linking process with the First Datastore (1010). Accordingly, no entity identifiers have been removed and the Temp Table (1200) is essentially the same as the first column (GroupID Minimization (1120)).

Figure 13:
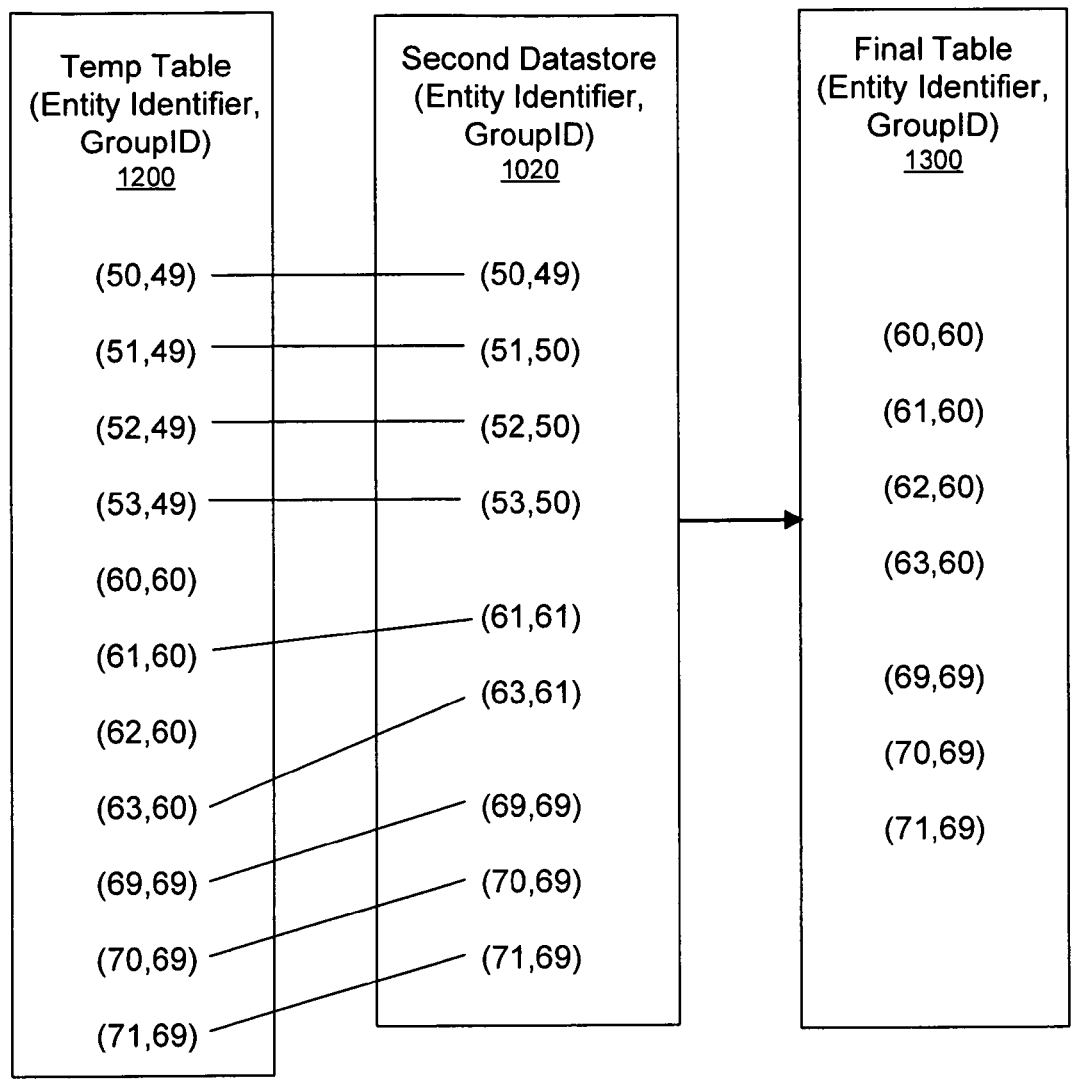

In FIG. 13, the Temp Table (1200) is then linked with the Second Datastore (1020) to identify contaminated entity identifiers in the intermediate entity identifier list. As before, the linking process is essentially as discussed above in reference to FIG. 4. The results of the linking process are shown in the third column (Final Table (1300)). Those skilled in the art will recognize that during the linking process, several entity identifiers were marked as contaminated (STEP 980) and then later removed (STEP 990) to produce the Final Table (1300) (i.e., the final entity identifier list).

As discussed above, the process shown in FIG. 9 extracts only consistent sets of entity identifiers from multiple, possibly inconsistent, sources. In other words, any entity identifier associated with a set violation, or any entity identifier marked as contaminated are not contained within an extracted set following the process shown in FIG. 9. For example, still referring to the Final Table (1300) (i.e., the final entity identifier list) in FIG. 13, the process shown in FIG. 9 has determined the entity identifier of value 60, the entity identifier of value 61, the entity identifier of value 62, and the entity identifier of value 63 all pertain to the same individual or entity. The process shown in FIG. 9 has also determined the entity identifier of value 69, the entity identifier of value 70, and the entity identifier of value 71 all pertain to the same individual or entity.

As discussed above, an organization may maintain one or more records associated with each individual or entity associated with the organization. In one or more embodiments of the invention, the extracted sets of entity identifiers may be used to determine to which individual or entity an entity identifier pertains, and to then retrieve the one or more records associated with the individual or entity.

Figure 14:
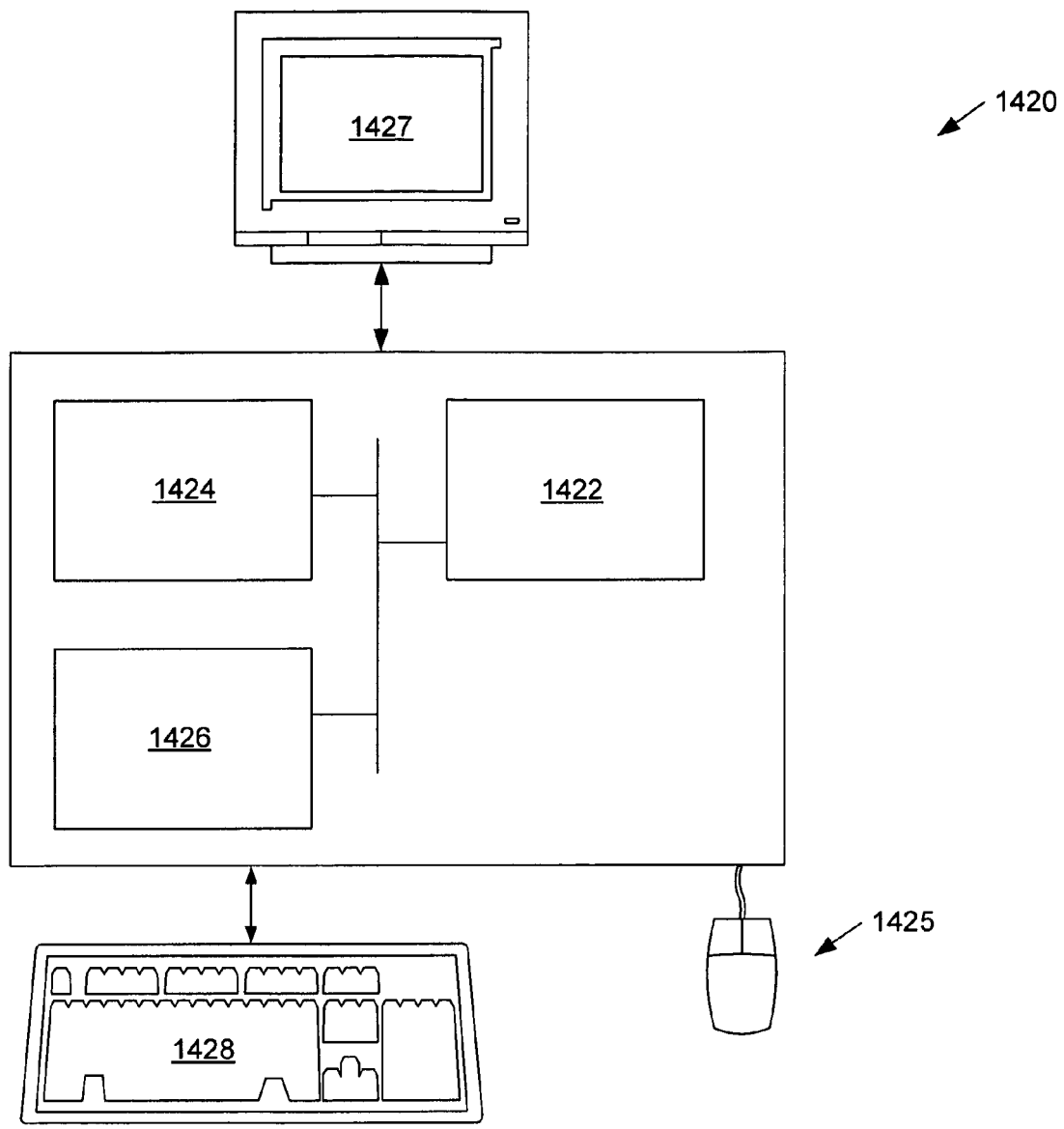
FIG. 14 shows a computer system in accordance with one or more embodiments of the invention.

The invention may be implemented on virtually any type of computer regardless of the platform being used. For example, as shown in FIG. 14, a computer system (1420) includes a processor (1424), associated memory (1422), a storage device (1426), and numerous other elements and functionalities typical of today's computers (not shown). The computer (1420) may also include input means, such as a keyboard (1428) and a mouse (1425), and output means, such as a monitor (1427). The computer system (1420) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (1420) may be located at a remote location and connected to the other elements over a network. Further, the invention may be implemented on a distributed system having a plurality of nodes. In one or more embodiments of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer implemented method for extracting a consistent set of entity identifiers comprising:
    obtaining a first set of entity identifiers comprising a first plurality of groups of entity identifiers using a grouping process;
    obtaining a second set of entity identifiers comprising a second plurality of groups of entity identifiers using the grouping process;
    subsequent to the grouping process, removing an entity identifier associated with a set violation from the first set of entity identifiers and the second set of entity identifiers, wherein the set violation corresponds to the first and second set of entity identifiers pertaining to a same entity, wherein the first and second set of entity identifiers are not identical and each contain at least two entity identifiers;
    associating each entity identifier from the first set of entity identifiers with at least one of a first plurality of GroupIDs, wherein each of the first plurality of GroupIDs is an entity identifier designated from among the first set of entity identifiers;
    associating each entity identifier from the second set of entity identifiers with at least one of a second plurality of GroupIDs, wherein each of the second plurality of GroupIDs is an entity identifier designated from among the second set of entity identifiers;
    linking at least one of the first plurality of GroupIDs having a common entity identifier with at least one of the second plurality of GroupIDs having the common entity identifier;
    during the linking, identifying a contaminated entity identifier associated with the at least one of the first and second plurality of GroupIDs based on a violation of a linking policy, wherein the linking policy is violated when one of the first plurality of GroupIDs is linked to more than one of the second plurality of GroupIDs;
    removing the contaminated entity identifier from the first and second set of entity identifiers based on the violation of the linking policy; and
    combining the first set of entity identifiers with the second set of entity identifiers following the removal of the contaminated entity identifier to extract the consistent set of entity identifiers.

2. The computer implemented method of claim 1, further comprising:
    retrieving a record using the consistent set of entity identifiers, wherein the record is associated with an entity identifier within the consistent set of entity identifiers.

3. The computer implemented method of claim 1, further comprising:
    adding the entity identifier associated with the set violation to a datastore.

4. The computer implemented method of claim 1, wherein associating each entity identifier from the first set of entity identifiers with the at least one of the first plurality of GroupIDs comprises:
  determining the entity identifier of lesser value from the first set of entity identifiers.

5. The computer implemented method of claim 1, wherein associating each entity identifier from the first set of entity identifiers with the at least one of the first plurality of GroupIDs comprises:
  determining the entity identifier of greater value from the first set of entity identifiers.

6. The computer implemented method of claim 1, wherein combining the first set of entity identifiers with the second set of entity identifiers comprises:
  performing a join operation on the first and second set of entity identifiers; and
  performing a GroupID minimization operation on the consistent set of entity identifiers.

7. The computer implemented method of claim 1, wherein combining the first set of entity identifiers with the second set of entity identifiers comprises:
  performing a join operation on the first and second set of entity identifiers; and
  performing a GroupID maximization operation on the consistent set of entity identifiers.

8. The computer implemented method of claim 1, wherein the linking policy is further violated when one of the second plurality of GroupIDs is linked to more than one of the first plurality of GroupIDs.

9. A computer implemented method for extracting a consistent set of entity identifiers comprising:
  obtaining a first set of entity identifiers comprising a first plurality of groups of entity identifiers using a grouping process;
  obtaining a second set of entity identifiers comprising a second plurality of groups of entity identifiers using the grouping process;
  subsequent to the grouping process, removing an entity identifier associated with a set violation from the first set of entity identifiers and the second set of entity identifiers, wherein the set violation corresponds to the first and second set of entity identifiers pertaining to a same entity, wherein the first and second set of entity identifiers are not identical and each contain at least two entity identifiers;
  associating each entity identifier from the first set of entity identifiers with at least one of a first plurality of GroupIDs, wherein each of the first plurality of GroupIDs is an entity identifier designated from among the first set of entity identifiers;
  associating each entity identifier from the second set of entity identifiers with at least one of a second plurality of GroupIDs, wherein each of the second plurality of GroupIDs is an entity identifier designated from among the second set of entity identifiers;
  combining the first set of entity identifiers with the second set of entity identifiers to generate a third set of entity identifiers, wherein each of the third set of entity identifiers is associated with at least one of a third plurality of GroupIDs;
  linking at least one of the third plurality of GroupIDs having a common entity identifier with at least one of the first plurality of GroupIDs having the common entity identifier;
  during the linking, identifying a contaminated entity identifier associated with the at least one of the first and third plurality of GroupIDs based on a violation of a linking policy, wherein the linking policy is violated when one of the first plurality of GroupIDs is linked to more than one of the third plurality of GroupIDs;
  removing the contaminated entity identifier from the first and third set of entity identifiers based on the violation of the linking policy; and
  combining the first set of entity identifiers with the third set of entity identifiers following the removal of the contaminated entity identifier to extract the consistent set of entity identifiers.

10. The computer implemented method of claim 9, further comprising:
  retrieving a record using the consistent set of entity identifiers, wherein the record is associated with an entity identifier within the consistent set of entity identifiers.

11. The computer implemented method of claim 9, further comprising:
  adding the entity identifier associated with the set violation to a datastore.

12. The computer implemented method of claim 9, wherein associating each entity identifier from the first set of entity identifiers with the at least one of the first plurality of GroupIDs comprises:
  determining the entity identifier of greater value from the first set of entity identifiers.

13. The computer implemented method of claim 9, wherein associating each entity identifier from the first set of entity identifiers with at least one of the first plurality of GroupIDs comprises:
  determining the entity identifier of lesser value from the first set of entity identifiers.

14. The computer implemented method of claim 9, further comprising:
  linking at least one of the third plurality of GroupIDs having the common entity identifier with at least one of the second plurality of GroupIDs having the common entity identifier based on the second and third set of entity identifiers.

15. The computer implemented method of claim 9, wherein combining the first set of entity identifiers with the second set of entity identifiers comprises:
  performing a join operation on the first and second set of entity identifiers; and
  performing a GroupID maximization operation on the third set of entity identifiers.

16. The computer implemented method of claim 9, wherein combining the first set of entity identifiers with the second set of entity identifiers comprises:
  performing a join operation on the first and second set of entity identifiers; and
  performing a GroupID minimization operation on the third set of entity identifiers.

17. The computer implemented method of claim 9, wherein the linking policy is further violated when one of the third plurality of GroupIDs is linked to more than one of the first plurality of GroupIDs.

18. A computer readable storage medium containing instructions for extracting a consistent set of entity identifiers, the instructions comprising functionality to:
  obtain a first set of entity identifiers comprising a first plurality of groups of entity identifiers using a grouping process;
  obtain a second set of entity identifiers comprising a second plurality of groups of entity identifiers using the grouping process;

subsequent to the grouping process, removing an entity identifier associated with a set violation from the first set of entity identifiers and the second set of entity identifiers, wherein the set violation corresponds to the first and second set of entity identifiers pertaining to a same entity, wherein the first and second set of entity identifiers are not identical and each contain at least two entity identifiers;

associate each entity identifier from the first set of entity identifiers with at least one of a first plurality of GroupIDs, wherein each of the first plurality of GroupIDs is an entity identifier designated from among the first set of entity identifiers;

associate each entity identifier from the second set of entity identifiers with at least one of a second plurality of GroupIDs, wherein each of the second plurality of GroupIDs is an entity identifier designated from among the second set of entity identifiers;

link at least one of the first plurality of GroupIDs having a common entity identifier with at least one of the second plurality of GroupIDs having the common entity identifier;

during the linking, identify a contaminated entity identifier associated with the at least one of the first and second plurality of GroupIDs based on a violation of a linking policy, wherein the linking policy is violated when one of the first plurality of GroupIDs is linked to more than one of the third plurality of GroupIDs;

remove the contaminated entity identifier from the first and second set of entity identifiers based on the violation of the linking policy; and combine the first set of entity identifiers with the second set of entity identifiers following the removal of the contaminated entity identifier to extract the consistent set of entity identifiers.

19. The computer readable storage medium of claim 18, the instructions further comprising functionality to:

retrieve a record using the consistent set of entity identifiers, wherein the record is associated with an entity identifier within the consistent set of entity identifiers.

20. The computer readable storage medium of claim 18, the instructions further comprising functionality to:

add the entity identifier associated with the set violation to a datastore.

21. The computer readable storage medium of claim 18, the instructions to associate each entity identifier from the first set of entity identifiers with the at least one of the first plurality of GroupIDs comprise functionality to:

determine the entity identifier of greater value from the first set of entity identifiers.

22. The computer readable storage medium of claim 18, the instructions to associate each entity identifier from the first set of entity identifiers with the at least one of the first plurality of GroupIDs comprise functionality to:

determine the entity identifier of lesser value from the first set of entity identifiers.

23. The computer readable storage medium of claim 18, the instructions to combine the first set of entity identifiers with the second set of entity identifiers comprise functionality to:

perform a join operation on the first and second set of entity identifiers; and perform a GroupID maximization operation on the consistent set of entity identifiers.

24. The computer readable storage medium of claim 18, the instructions to combine the first set of entity identifiers with the second set of entity identifiers comprise functionality to:

perform a join operation on the first and second set of entity identifiers; and perform a GroupID minimization operation on the consistent set of entity identifiers.

25. The computer readable storage medium of claim 18, wherein the linking policy is further violated when one of the third plurality of GroupIDs is linked to more than one of the first plurality of GroupIDs.

26. A computer readable storage medium for extracting a consistent set of entity identifiers, the instructions comprising functionality to:

obtain a first set of entity identifiers comprising a first plurality of groups of entity identifiers using a grouping process;

obtain a second set of entity identifiers comprising a second plurality of groups of entity identifiers using the grouping process;

subsequent to the grouping process, removing an entity identifier associated with a set violation from the first set of entity identifiers and the second set of entity identifiers, wherein the set violation corresponds to the first and second set of entity identifiers pertaining to a same entity, wherein the first and second set of entity identifiers are not identical and each contain at least two entity identifiers;

associate each entity identifier from the first set of entity identifiers with at least one of a first plurality of GroupIDs following the removal of the entity identifier associated with the set violation, wherein each of the first plurality of GroupIDs is an entity identifier designated from among the first set of entity identifiers;

associate each entity identifier from a second set of entity identifiers with at least one of a second plurality of GroupIDs, wherein each of the second plurality of GroupIDs is an entity identifier designated from among the second set of entity identifiers;

combine the first set of entity identifiers with the second set of entity identifiers to generate a third set of entity identifiers, wherein each of the third set of entity identifiers is associated with at least one of a third plurality of GroupIDs;

link at least one of the third plurality of GroupIDs having a common entity identifier with at least one of the first plurality of GroupIDs having a common entity identifier;

during the linking, identify a contaminated entity identifier associated with the at least one of the first and third plurality of GroupIDs based on a violation of a linking policy, wherein the linking policy is violated when one of the first plurality of GroupIDs is linked to more than one of the third plurality of GroupIDs;

remove the contaminated entity identifier from the first and third set of entity identifiers based on the violation of the linking policy; and combine the first set of entity identifiers with the third set of entity identifiers following the removal of the contaminated entity identifier to extract the consistent set of entity identifiers.

27. The computer readable storage medium of claim 26, the instructions further comprising functionality to:

retrieve a record using the consistent set of entity identifiers, wherein the record is associated with an entity identifier within the consistent set of entity identifiers.

28. The computer readable storage medium of claim 26, the instructions further comprising functionality to:

add the entity identifier associated with the set violation to a datastore.

29. The computer readable storage medium of claim 26, the instructions to associate each entity identifier from the first set of entity identifiers with at least one of the first plurality of GroupIDs comprise functionality to:
  determine the entity identifier of greater value from the first set of entity identifiers.

30. The computer readable storage medium of claim 26, the instructions to associate each entity identifier from the first set of entity identifiers with at least one of the first plurality of GroupIDs comprise functionality to:
  determine the entity identifier of lesser value from the first set of entity identifiers.

31. The computer readable storage medium of claim 26, the instructions further comprising functionality to:
  link at least one of the third plurality of GroupIDs having the common entity identifier with at least one of the second plurality of GroupIDs having the common entity identifier based on the second and third set of entity identifiers.

32. The computer readable storage medium of claim 26, the instructions to combine the first set of entity identifiers with the second set of entity identifiers comprise functionality to:
  perform a join operation on the first and second set of entity identifiers; and
  perform a GroupID maximization operation on the third set of entity identifiers.

33. The computer readable storage medium of claim 26, the instructions to combine the first set of entity identifiers with the second set of entity identifiers comprise functionality to:
  perform a join operation on the first and second set of entity identifiers; and
  perform a GroupID minimization operation on the third set of entity identifiers.

34. The computer readable storage medium of claim 26, wherein the linking policy is further violated when one of the third plurality of GroupIDs is linked to more than one of the first plurality of GroupIDs.

* * * * *